United States Patent [19]

Zuckerwar

[11] 4,445,378

[45] May 1, 1984

[54] ACOUSTIC GROUND IMPEDANCE METER

[75] Inventor: Allan J. Zuckerwar, Newport News, Va.

[73] Assignee: The United States of America as represented by the Administrator of the National Aeronautics and Space Administration, Washington, D.C.

[21] Appl. No.: 444,150

[22] Filed: Nov. 24, 1982

[51] Int. Cl.³ ............................................. G01N 29/00
[52] U.S. Cl. ........................................ 73/589; 73/594; 367/189; 181/121
[58] Field of Search ........................ 73/589, 594, 584; 367/189, 49; 181/108, 113, 114, 121

[56] References Cited

U.S. PATENT DOCUMENTS

| | | |
|---|---|---|
| 1,795,647 | 3/1931 | Flanders . |
| 1,816,917 | 8/1931 | Smythe et al. . |
| 2,837,914 | 6/1958 | Caldwell . |
| 2,981,096 | 4/1961 | Carrell . |
| 3,288,241 | 11/1966 | Bancroft et al. . |
| 3,710,615 | 1/1973 | Johnson et al. . |
| 3,883,841 | 5/1975 | Norel et al. . |
| 3,934,673 | 1/1976 | Silverman ........................... 181/119 |
| 4,283,953 | 8/1981 | Plona ..................................... 73/589 |
| 4,325,255 | 4/1982 | Howard et al. . |

*Primary Examiner*—Anthony V. Ciarlante
*Attorney, Agent, or Firm*—Howard J. Osborn; John R. Manning; William J. King

[57] ABSTRACT

Method and apparatus for measuring the acoustic impedance of a surface in which the surface is used to enclose one end of the chamber of a Helmholz resonator. Acoustic waves are generated in the neck of the resonator by a piston driven by a variable speed motor through a cam assembly. The acoustic waves are measured in the chamber and the frequency of the generated acoustic waves is measured by an optical device. These measurements are used to compute the compliance and conductance of the chamber and surface combined. The same procedure is followed with a calibration plate having infinite acoustic impedance enclosing the chamber of the resonator to compute the compliance and conductance of the chamber alone. Then by subtracting, the compliance and conductance for the surface is obtained.

9 Claims, 6 Drawing Figures

ACOUSTIC GROUND IMPEDANCE METER

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

The invention releates generally to acoustic impedance measuring devices and more specifically concerns measuring the specific acoustic impedance of the Earth's ground surface, or other surfaces, over a continuous band of frequencies in the low audio range.

The "acoustic impedance" of a surface is defined as the ratio of the sound pressure to the incident volume velocity of the air above the surface. This is also called the acoustic "surface impedance," or in the case of the Earth's ground surface, the acoustic "ground impedance". The "volume velocity" is defined as the acoustical particle velocity of the air times its cross-sectional area, in other words, the volume of air displaced past a reference plane per unit time. The "specific acoustic impedance" of the ground surface is the ground impedance multiplied by its test area.

Previous methods for performing the function of the invention can be organized into the following cateories: (1) impedance tube and waveguide methods in general; (2) free field methods, of which there are several variations based on the type of excitation (steady state harmonic, steady state wideband, or transient), the angle of incidence (normal or oblique), the number of microphones (usually one or two), and the parameter-evaluation technique (Fourier transform, transfer function, or curve fitting to multiparameter models); and (3) direct sound pressure-volume velocity measurement methods, in which the volume velocity is measured by means of a hot-wire anemometer or magnetic search coil.

The impedance tube suffers a major disadvantage in field applications: it requires an accurate measurement of the distance from the first interference minimum to an ill-defined test surface. Furthermore, because each frequency of operation requires several sound pressure measurements, the method is time-consuming and often introduces modifications of the test surface during the course of the measurement.

Free field methods suffer the disadvantage that free field sound propagation is subject to environmental distrubances such as wind, turbulence, thermal gradients, and background noise, and is sensitive to landscape features. Some of these methods utilize wave interference and are subject to the same disadvantages as the impedance tube. Some are mathematically intricate, relying on questionable assumptions, such as the planarity or sphericity of the wave front.

The major difficulty with direct sound pressure—volume velocity measurement methods lies in the measurement of volume velocity. The hot-wire anemometer is difficult to calibrate in the absence of mean flow and is not well suited for purely acoustical excitation. A magnetic search coil mounted on the back surface of an electrodynamically driven piston will cause measurement errors due to dynamic effects and due to mutual inductance with the drive coil, and will be relatively insensitive at low frequencies.

It is an object of this invention to provide a method and device for accurately measuring the acoustic impedance of a surface that do not have the disadvantages of the prior art methods and devices.

Another object of the invention is to provide a simple, compact and portable device for measuring the acoustic impedance of a ground surface.

Other objects and advantages of this invention will become apparent hereinafter in the specification and drawings.

SUMMARY OF THE INVENTION

The invention is a method and apparatus for measuring the acoustic impedance of a surface—specifically the Earth's ground surface. The invention consists essentially of a chamber having enclosed sides and first and second ends with the first end open and adapted to be fitted to the surface to be measured. A neck having a smaller cross-sectional area than the second end of the chamber is attached to the second end of the chamber such that the space inside the neck extends into the space inside the chamber to form a Helmohlz resonator. A piston is located inside the neck and a cam and variable speed motor assembly is provided for imparting a back and forth movement of the piston in the neck at a selected frequency. This back and forth movement produces sound waves in the chamber that are measured by a microphone. The frequency of the back and forth movement of the piston is measured by an optical device. These measurements are used to compute the acoustic impedance of a surface.

DETAILED DESCRIPTION OF THE INVENTION

Figure 1:
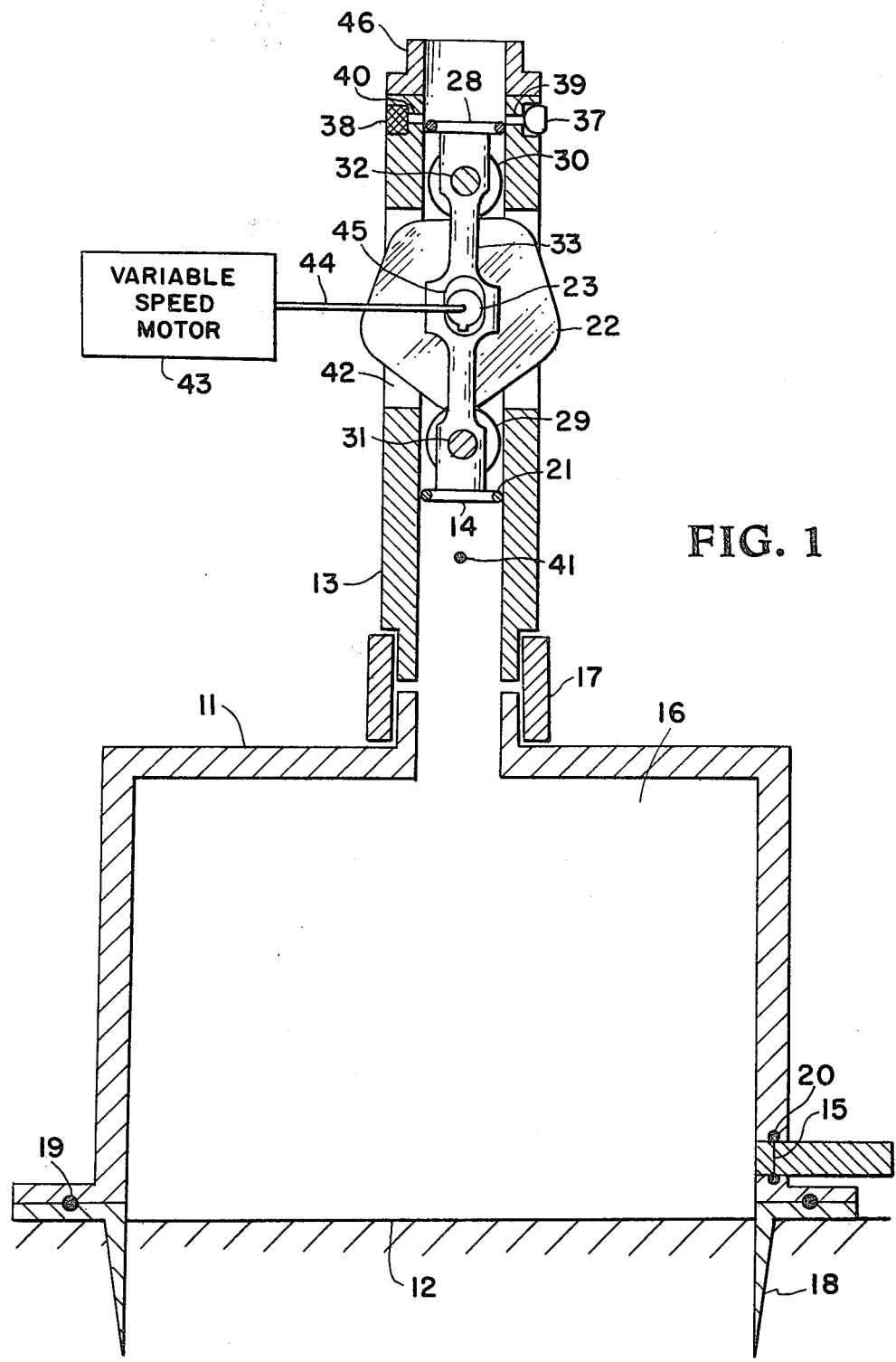
FIG. 1 is a schematic drawing of the mechanical elements of the invention.

The principal of measurement is illustrated in FIG. 1. A heavy-walled chamber 11, constructed of a material with high acoustic impedance but open at the bottom, is positioned over a test surface 12 having the unknown impedance. The volume velocity source is located in a neck 13. The chamber 11 and neck 13 constitute a Helmholz resonator, in which a vibrating piston 14 is located at the position normally taken by the orifice of the resonator. The vibrating piston 14 generates a known time-varying volume velocity in the neck of the resonator. The law of conservation of volume velocity requires that the volume of air displaced by the piston per unit time in the neck 13 be equal to that displaced in the chamber 11. The time-varying displacement of air in the chamber produces a sound pressure, which is measured on a microphone 15. The real and imaginary parts of the acoustic impedance of the test surface are determined from measurements of the amplitude of the sound pressure, the phase angle of the sound pressure relative to the piston displacement, and the frequency of vibration.

The size of the chamber is chosen to fulfill two conflicting requirements: it must be large enough to fit comfortably over coarse surfaces and moderately tall grasses, and cover a sufficiently representative area of the test surface; but it must be small enough that its linear dimensions be considerably less than an acoustic half-wavelength and thus permit operation in the lumped element mode. In this mode of operation the sound pressure and volume velocity of the air are uniform throughout each respective part of the instrument, i.e., the neck 13 and chamber 11, and any manifestations of wave phenomena, e.g., interference effects, are absent. Accordingly, the displaced air behaves as an incompressible mass in the neck but as a massless, readily compressible fluid in the chamber. Typical dimensions for the interior 16 of the chamber are nine inches for the diameter and six inches for the height to permit operation at frequencies up to about 300 Hz. A reduction in chamber height to two inches will permit extension of the operating frequency range to about 900 Hz.

The neck 13 does not make direct physical contact with the chamber 11, but is connected thereto by means of a flexible hose 17 to suppress acoustic transmission through the walls of the neck and chamber. Because the flexible hose 17 may not be strong enough to support the neck, the latter may have to be supported by some other means, e.g., an adapter 46 to connect the neck to the center post of an ordinary camera tripod.

The chamber 11 is bolted to a knife edge 18, pressed into the test surface 12, to prevent leakage of air between the ambient atmosphere and the combined volume of the chamber and the acoustically active region of the neck (i.e., the region below piston 14). The chamber and neck contain, in addition, the following seals for this purpose: an O-ring 19 between the chamber and knife edge 18; and O-ring 20 about the microphone 15, which is flush mounted in the wall of the chamber; flexible hose 17 between the chamber 11 and neck 13; and piston ring 21 between piston 14 and the wall of the neck.

The separation of the volume velocity source from the chamber—in contrast to the conventional pistonphone arrangement, in which the volume velocity source is located within the chamber—serves two purposes. First, it permits the dampening of wall borne sound that reaches the microphone, as discussed above. Secondly, it permits determination of the interior chamber volume 16 through measurement of the Helmholz resonant frequency, as is well known from elementary acoustical considerations; for the interior chamber volume, an important parameter in the evaluation of the acoustic impedance of the test surface, may be difficult to measure directly if the test surface is irregular.

Figure 3:
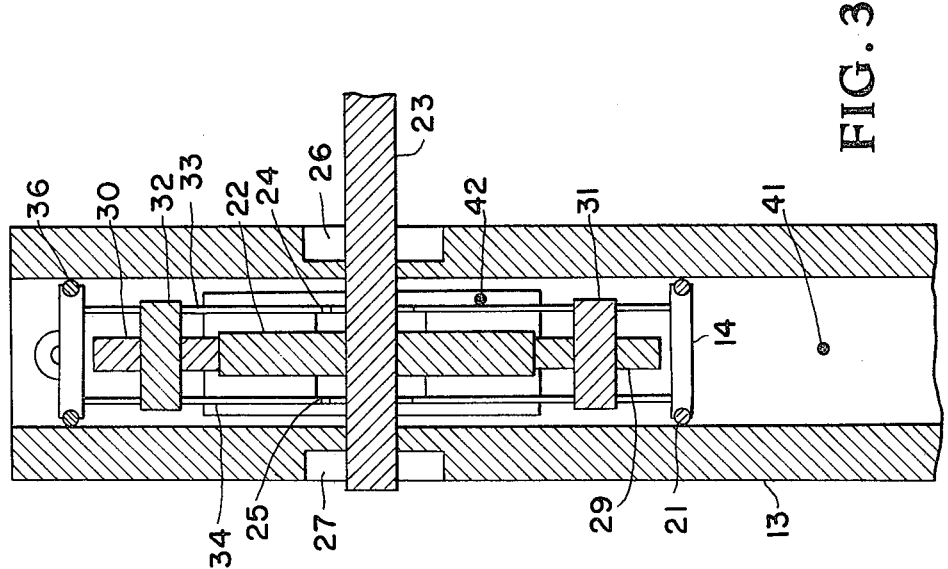
FIG. 3 is a side view of the upper part of FIG. 1.
Figure 2:
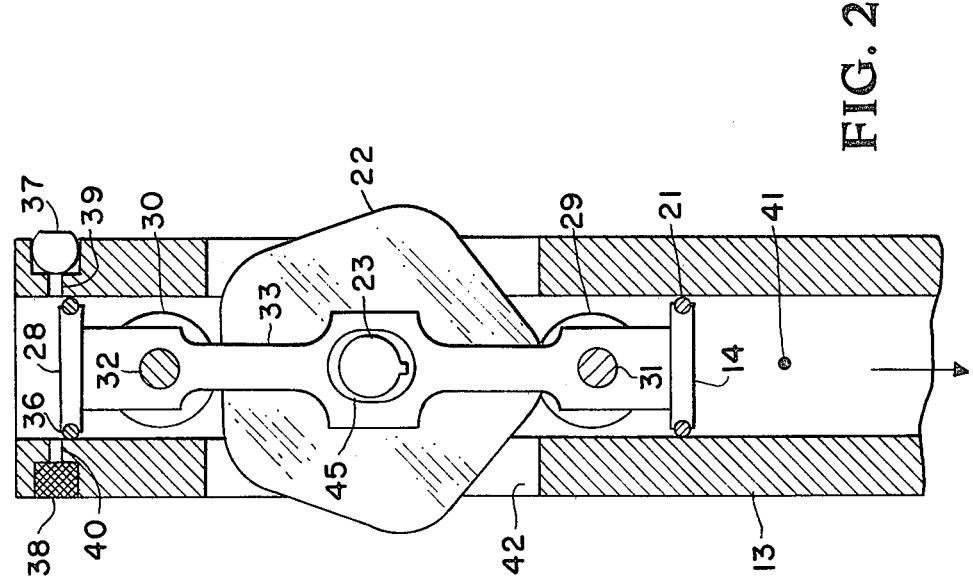
FIG. 2 is a front view of the upper part of FIG. 1.

The volume velocity source, located in the neck 13 of the resonator, consists of four parts: a cam assembly, a piston assembly, an optical phase detector, and a housing. The cam assembly, as shown in FIGS. 2 and 3, consists of a cam 22 with a sinusoidal contour, a cam shaft 23, cam spacers 24 and 25, and cam shaft bearings 26 and 27. The piston assembly consists of two pistons 14 and 28, cam follower bearings 29 and 30, cam follower shafts 31 and 32, connecting strips 33 and 34, and piston rings 35 and 36. The optical phase detector consists of a light emitting diode 37 (LED), a photodetector 38, and apertures 39 and 40. The housing, fabricated from square stock, has a bore 41, which contains the piston assembly and guides the piston motion, and a slot 42 to accommodate the cam 22, because the latter has a diameter exceeding the width of the neck.

A variable speed motor 43, shown in FIG. 1, drives the cam 22, through shaft 44 and cam shaft 23, at a selected speed and thus a selected acoustical frequency; for the acoustical frequency is equal to the motor speed, in revolutions per minute, times the number of lobes of the cam divided by sixty. The cam follower bearings 29 and 30, pressed against the cam with a slight preload, rotate along the periphery of the cam, and force the pistons 14 and 28 into reciprocating motion. The cam follower bearings and pistons are held in place by means of cam follower shafts 31 and 32 and connecting strips 33 and 34, as shown in FIG. 3. This arrangement is possible only if the cam has an odd number of lobes. Cam follower shafts 31 and 32 are eccentric to permit adjustment of the preload on the cam follower bearings 29 and 30. Because the cam periphery has a sinusoidal contour, the piston displacement and velocity will vary sinusoidally with time. A slot 45 in each connecting strip 33 or 34 permits vertical motion of the piston assembly relative to the cam shaft 23. The cam shaft 23 is seated in a pair of bearings 26 and 27, each press-fitted into a counterbore in the wall of the neck. Cam spacers 24 and 25 position the cam in the center of the bore 41. The lower piston 14, serving as the sound generator, produces a sound pressure in the chamber. The upper piston 28 interrupts a light beam passing from the light-emitting diode 37, through apertures 39 and 40, to the photodetector 38, at which output the electrical signal, in phase with the piston displacement, is compared to the microphone output signal on a phase meter. Piston rings 35 and 36, made of soft, low-friction material, prevent the pistons from rubbing against the bore wall and seal the neck. Typical dimensions are 0.750 inch for the bore diameter and 0.08 inch for the piston stroke, which together will produce a sound pressure level of approximately 107 dB (re: $2 \times 10^{-5}$ Pa) in a chmaber having an interior nine inches diameter by six inches in height. If the motor has a rated speed of 3600 rpm, then the maximum operating frequency of the invention will be 300 Hz for a 5-lobed cam and 900 Hz for a 15-lobed cam.

Figure 5:
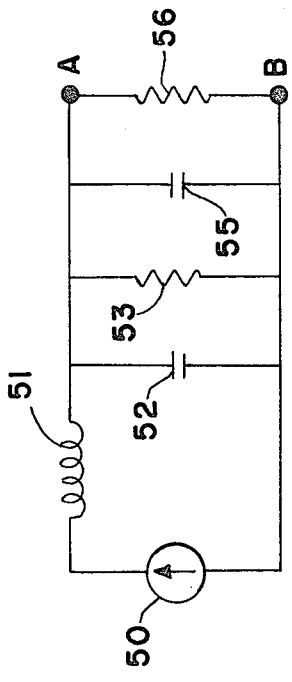
FIG. 5 shows the analog circuit for the device in FIG. 1 with the surface whose acoustic impedance is to be measured.
Figure 4:
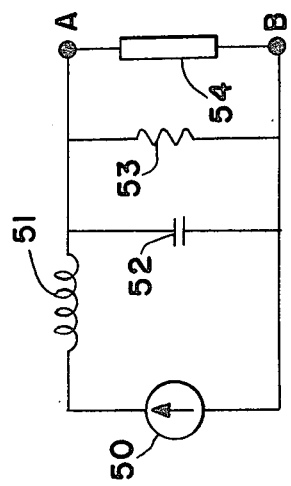
FIG. 4 shows the analog circuit for the device in FIG. 1 when a calibration plate having infinite acoustic impedance is used as the surface to be tested.

Evaluation of the acoustic ground impedance from the measured sound pressure and phase angle is best described in terms of the electrical analog circuits of FIGS. 4 and 5. In these circuits an acoustic volume velocity source is represented by a electric current source, a sound pressure by a voltage, an acoustic mass by an inductance, an acoustic compliance by a capacitance, an acoustic conductance by an electric conductance.

FIG. 4 shows the analog circuit with the test surface replaced by a thick calibration plate, for example a ¾-inch thick stainless steel plate, assumed to have infinite acoustic impedance or zero acoustic admittance. The vibrating piston 14 is represented by the source 50 of known volume velocity; the neck by the acoustic mass 51; the chamber by the acoustic compliance 52, which represents the compressiblility of the contained air, in parallel with the acoustic conductance 53, which accounts for acoustic losses; the calibration plate by an element 54 having infinite impedance. Since the magnitude of the volume velocity generated at the source 50 is known, measurement of the sound pressure at the microphone, which appears across points A and B in the analog circuit, and the phase angle of this pressure with respect to the volume velocity permits evaluation of the unknown compliance 52 and conductance 53 at each operating frequency. The phase difference between the sound pressure and volume velocity is readily determined from the measured phase difference between the sound pressure and piston displacement, because the volume velocity always leads the piston displacement by a phase angle of 90°.

FIG. 5 shows the analog circuit with the calibration plate 54 replaced by the test surface, represented by a compliance 55 and conductance 56 in parallel with the elements 52 and 53 of the chamber. Now the measurement of the sound pressure at the microphone, again across points A and B, and the phase angle of this pressure with respect to the volume velocity yields the sum of the compliances 52 and 55 and the sum of the conductances 53 and 56, respectively, at each operating frequency. Consequently, at each frequency the unknown compliance 55 of the test surface is just the measured sum of the compliances 52 and 55 less the measured compliance 52 of the chamber alone; the unknown conductance 56 of the test surface is similarly just the measured sum of the conductances 53 and 56 less the measured conductance 53 of the chamber along. The imaginary part of the acoustic admittance of the test surface is the acoustical angular frequency times the compliance 55; the real part is the conductance 56. The acoustic impedance of the test surface is the reciprocal of the acoustic admittance. The specific acoustic impedance of the test surface is the acoustic impedance multiplied by the cross-sectional area of the chamber interior.

Figure 6:
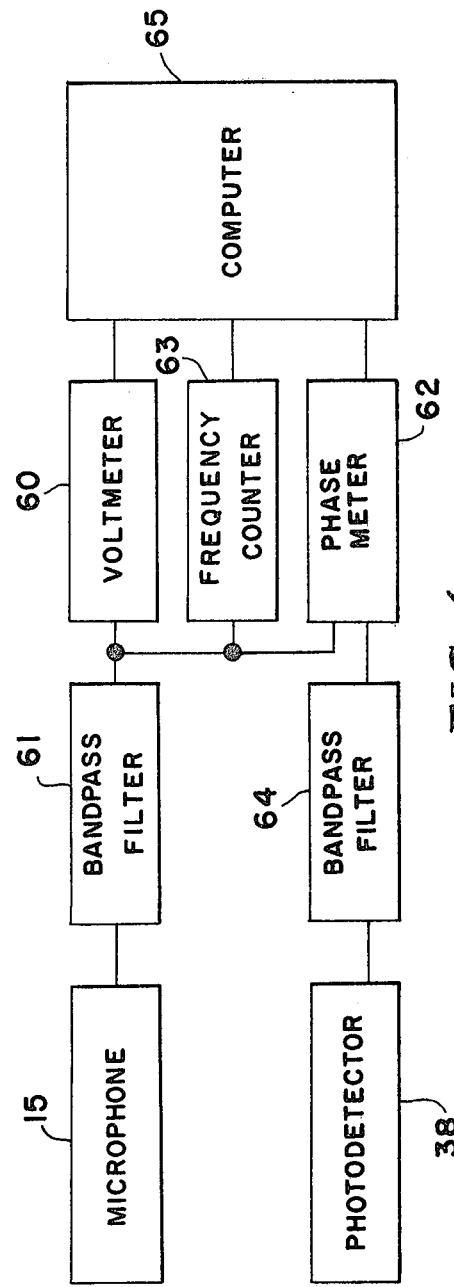
FIG. 6 is a block diagram of the electrical components of the invention.

To utilize the technique described with the electrical analog circuits in FIGS. 4 and 5, the electrical circuitry shown in FIG. 6 is needed. The output of microphone 15 is measured by a voltmeter 60 after it passes through a bandpass filter 61. The output of bandpass filter 61 is also applied to a phase meter 62 and a frequency counter 63. The output of photodetector passes through a bandpass filter 64 to phase meter 62. The purpose of identical bandpass filters 61 and 64 is to remove spurious signals and noise from the microphone 15 and photodetector 38 output signals. The outputs of voltmeter 60, frequency counter 63, and phase meter 62 are used to compute the acoustic impedance of a surface in accordance with the technique described in FIGS. 4 and 5. The computation can be made by hand or by means of a computer 65.

The advantages of this invention are numerous. The direct sound pressure-volume velocity measurement method used by this invention has the following advantages over other methods: (a) Compactness and portability. The invention can be set up at any desired test site, irrespective of landscape features, weather, or environmental conditions. (b) Speed of operation. A series of measurements can be completed before constitutive changes in the ground surface, e.g., in moisture or organic content, can take place. This feature makes the invention particularly suitable for use in conjunction with other acoustical measurements, e.g., aircraft noise measurements. (c) Simplicity. At each frequency the acoustic impedance is evaluated from measurement of one sound pressure and one phase angle for the test surface, and similar data for the calibration plate.

The Helmholz resonator arrangement used by this invention has the following advantages: (a) Wall-borne acoustic transmission from the volume velocity source to the microphone can be suppressed by means of a flexible connecting hose. (b) The chamber volume can be determined by measrement of the Helmholz resonant frequency. This may prove important if the test surface is irregular.

The use of a cam driven piston for the volume velocity source offers the following advantages: (a) The volume velocity is defined by the known piston stroke and need not be measured independently. (b) The harmonic content of the volume velocity can be made very low by precise machining of the cam. (c) The upper operating frequency can be made many times the rotational frequency of the motor through use of a large number of cam lobes.

The use of the piston assembly has the following advantages: (a) The use of rigid connecting strips, instead of springs, to press the cam follower bearings against the cam ensures that the pistons will not float at high frequencies. (b) The use of cam follower bearings which rotate about the cam periphery, instead of low friction piston tips which slide about periphery, extends the operating life of the piston assembly and reduces distortion due to wear of contacting parts. (c) The symmetrical piston arrangement provides balanced loading of the cam and prevents wobble of the cam shaft.

It is to be understood that the form of the invention herewith shown and described is to be taken as a preferred embodiment. Various changes can be made without departing from the invention. The volume velocity source could be located within the chamber as in a conventional pistonphone. The microphone could be located inside the chamber instead of being flush mounted in the wall of the chamber. This alternate location could possibly reduce wall borne acoustic transmission to the microphone if the neck were rigidly connected to the chamber. The cam follower bearings could be replaced by piston tips, made of low friction material, which slide about the cam periphery. The connecting strips could be replaced by a spring arrangement to keep the cam followers pressed against the cam. A mechanical speed reducer could be inserted between the motor and cam shaft to extend the lower range of operating frequency. The optical phase detector could be replaced by an alternative displacement sensor to provide the electrical signal for phase angle reference.

What is claimed is:

1. Apparatus for measuring the acoustic impedance of a surface over a continuous band of frequencies comprising:

a chamber having enclosed sides and first and second ends with the first end open and adapted to be fitted to said surface;

a neck having a smaller cross-sectional area than the ends of said chamber attached to said second end of said chamber such that the space inside said neck extends into the space inside said chamber wherein said chamber and said neck form a Helmholz resonator;

a piston inside said neck;

means for moving said piston back and forth inside said neck at selected frequencies;

means attached to a side of said chamber for measuring the acoustic waves created inside said chamber by the back and forth movement of said piston; and means for measuring the frequency of the back and forth movement of said piston whereby the acoustic impedance can be computed.

2. Apparatus for measuring the acoustic impedance of a surface according to claim 1 wherein said means for measuring the acoustic waves created by the back and forth movement of said piston is a microphone.

3. Apparatus for measuring the acoustic impedance of a surface according to claim 1 including means for obtaining the phase difference between the measurements of said acoustic waves and the frequency of the back and forth movement of said piston.

4. Apparatus for measuring the acoustic impedance of a surface according to claim 1 wherein said means for moving said piston back and forth inside said neck includes a cam rotated by a variable speed motor.

5. Apparatus for measuring the acoustic impedance of a surface according to claim 4 wherein said means for measuring the frequency of the back and forth movement of said piston includes an optical detector means.

6. Apparatus for measuring the acoustic impedance of a surface according to claim 4 wherein said means for measuring the frequency of the back and forth movement of said piston includes a second piston controlled by said cam such that the second piston has the same frequency of back and forth movement as the first said piston, an optical detector means with a beam of light that is transverse to the path of said back and forth movements of said second piston such that the piston interrupts the beam of light during each cycle of movement of said second piston and means for counting the interruptions of said beam of light.

7. Apparatus for measuring the acoustic impedance of a surface according to claim 6 wherein said optical detector means includes a light emitting diode and a photodetector.

8. Apparatus for measuring the acoustic impedance of a surface according to claim 6 wherein said cam has an odd number of lobes, a first cam follower attached to the first of said pistons, a second cam follower attached to said second piston for moving said second piston and connecting strips for connecting said first and second cam followers and holding them against said cam.

9. A method for determining the impedance of a surface comprising the steps of:
  enclosing one end of a Helmholz resonator with a calibration plate having infinite acoustic impedance;
  generating acoustic waves in the neck of said Helmholz resonator;
  counting the frequency at which the acoustic waves are generated;
  measuring the acoustic waves in the chamber of said Helmholz resonator that were generated in the neck;
  measuring the phase difference between the counted frequency and the measured acoustic waves;
  computing the compliance and the conductance for the chambers from the measured data;
  substituting the surface whose impedance is to be measured for the calibration plate;
  making the same measurements as above to obtain chamber and surface measured data;
  computing the compliance and the conductance for the chamber and the surface from the chamber and surface data; and
  determining from the compliance and conductance of the chamber and the compliance and conductance of the chamber and surface, the compliance and conductance of the surface.

* * * * *